United States Patent [19]

Bradley et al.

[11] 4,246,536

[45] Jan. 20, 1981

[54] ELECTRONIC VELOCITY MEASUREMENT DEVICE

[75] Inventors: Edward F. Bradley; Francis E. Mueller, both of San Jose, Calif.

[73] Assignee: International Business Machines Corporation, Armonk, N.Y.

[21] Appl. No.: 947,278

[22] Filed: Sep. 29, 1978

[51] Int. Cl.³ .................. G01P 3/46; G11B 21/02
[52] U.S. Cl. ..................................... 324/177; 360/75
[58] Field of Search ................. 324/177, 160; 360/78, 360/75, 77; 318/618, 397, 398

[56] References Cited

U.S. PATENT DOCUMENTS

| | | | |
|---|---|---|---|
| 3,351,829 | 11/1967 | Quarnstrom . | |
| 3,568,059 | 3/1971 | Sordello . | |
| 3,811,091 | 5/1974 | Ha et al. . | |
| 3,883,894 | 5/1975 | Johnson | 324/177 X |
| 3,942,114 | 3/1976 | Keeling | 324/177 |
| 4,030,132 | 6/1977 | Iftikar et al. | 360/78 |
| 4,103,314 | 7/1978 | Case | 360/78 |
| 4,115,823 | 9/1978 | Commander et al. | 360/78 X |
| 4,133,011 | 1/1979 | Kurzweil | 360/78 |
| 4,138,728 | 2/1979 | Tung | 360/78 X |
| 4,168,457 | 9/1979 | Rose | 360/78 X |

*Primary Examiner*—Gerard R. Strecker
*Attorney, Agent, or Firm*—Nathan N. Kallman

[57] ABSTRACT

An improved electronic velocity measurement device for an accessing type disk drive combines a differentiated cyclically discontinuous displacement (position error) signal (PES) with integrated motor current signals to produce an accurate continuous velocity signal over the entire range of displacements of a linear actuator. Differentiation of the displacement signal is achieved by low bandwidth differentiator circuitry that is corrected for periodic reversal of the displacement signal by a unique fill-in signal derived from integrated motor current. In a specific embodiment, the fill-in signal is derived by the use of a second differentiator using a second displacement signal in space quadrature with the primary displacement signal.

8 Claims, 12 Drawing Figures

ELECTRONIC VELOCITY MEASUREMENT DEVICE

DESCRIPTION

Technical Field

This invention relates to position and velocity sensing, and in particular to electronic velocity measurement devices.

An object of this invention is to provide an improved electronic velocity measurement device that generates an accurate continuous velocity signal.

Another object of this invention is to provide an electronic velocity measurement device that maintains a linear output velocity signal at low actuator velocities.

Another object of this invention is to provide an electronic velocity measurement device which effectively eliminates the effects of input signal noise while maintaining wideband velocity signal accuracy.

BACKGROUND ART

Disk drive systems that employ accessing heads require that a selected read/write head be transported to a selected data track in a minimum amount of time. To achieve this objective, it is necessary to obtain accurate velocity information so that the velocity of the head actuator may be properly controlled during a SEEK operation. One type of velocity measurement device is sometimes designated as an electronic tachometer, such as described in U.S. Pat. No. 3,820,712, issued to R. K. Oswald, and assigned to the same assignee. However, as track density increases, requirements for accuracy of velocity sensing become more stringent.

A signal commonly used for derivation of actuator velocity is the displacement signal PES. The PES is a cyclically reversing signal passing through zero at each track center and becoming nonlinear in the region of slope reversal midway between track centers. In some prior art electronic tachometers, PES is sensed and differentiated over a given displacement to provide a first velocity signal indicative of the velocity of the accessing mechanism, which may be a voice coil motor, for example. The current in the voice coil motor is detected and integrated over that displacement to provide a second velocity signal that is combined with the first velocity signal to compensate for the discontinuities and nonlinear portions of the PES signal. The combined velocity signal is continuously measured and the accessing device is accelerated or decelerated so that the actual velocity approaches a predetermined ideal velocity.

Some prior art electronic tachometers employ differentiators with wide bandwidths to recover from PES discontinuities. However, systems using differentiators with wide bandwidths tend to suffer from undue noise and nonlinear output at low velocities, among other things. One method for eliminating velocity noise error is to band limit the differentiator. However this approach produces velocity errors at high velocities and accelerations, and excessive phase shift in the velocity signal.

SUMMARY OF THE INVENTION

An electronic velocity measurement device for use in a random access disk drive includes means to utilize discontinuous displacement signals over a limited frequency range to generate velocity signal components; means to fill in and continuously update the velocity output signal during the discontinuous nonlinear portions of the displacement signal; means to use voice coil motor current to generate velocity signal components at high acceleration rates; and means to combine the velocity signal components generated from the displacement signals and voice coil motor current to produce an accurate velocity signal over the entire available velocity range.

BRIEF DESCRIPTION OF THE DRAWINGS

The invention will be described in greater detail with reference to the drawings in which.

DISCLOSURE OF THE INVENTION

Figure 1:
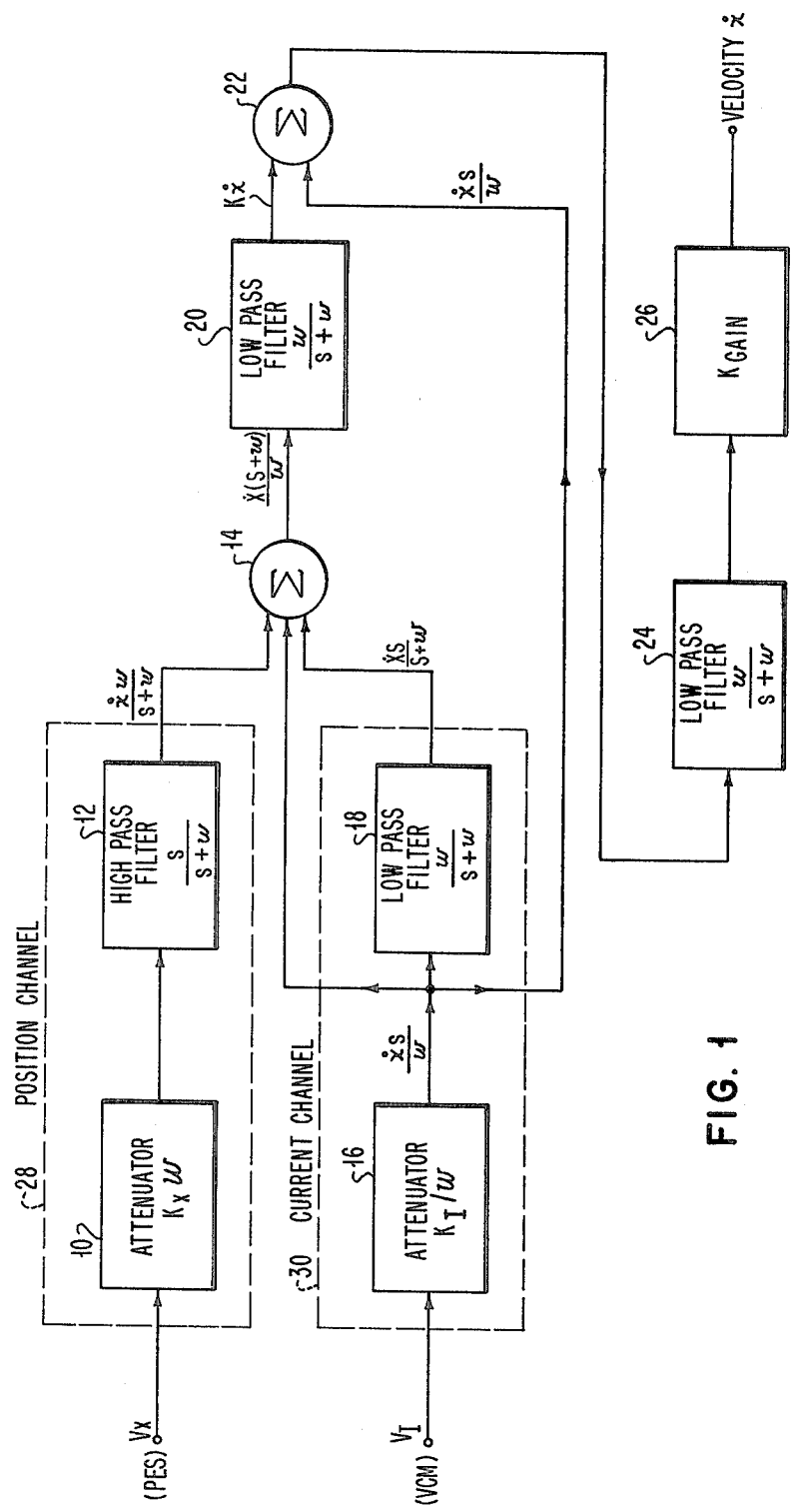
FIG. 1 is a representational block diagram of a linear displacement equivalent circuit for the electronic velocity measurement device to aid in the explanation of this invention.

With reference to the equivalent circuit of FIG. 1, a displacement signal (PES) is derived from sensing the movement of a device, such as a magnetic head assembly mounted to a voice coil motor, across the recorded tracks of a rotating magnetic disk in a disk drive, by way of example. The PES signal $V_x$ is applied to an attentuator stage 10, designated as $K_x\omega$ where $K_x$ is a constant representing the position channel attenuation factor and $\omega$ is the filter corner frequency. The attenuated signal is fed to a high pass filter 12, labeled $s/(s+\omega)$ where s is d/dt, the differentiation function. The differentiated signal, noted as $(\dot{x}\omega)/(s+\omega)$ is the signal, proportional to velocity, that is applied to a summing circuit 14. The position signal, from which the velocity signal is generated, contains broadband noise components, resulting from disk surface irregularities, among other things.

Concurrently the current of the voice coil actuator is sensed and a voltage $V_I$ representative of the current magnitude is applied to an attenuator stage 16, designated as $K_i\omega$ where $K_i$ is a constant representing the current channel attenuation factor. The current signal, which is proportional to the acceleration or deceleration of the voice coil, is passed through a low pass filter 18, illustrated as $\omega/(s+\omega)$. The low pass filter provides a $-6$db per octave rolloff thereby reducing signal noise components. The attenuated current magnitude signal $(\dot{x}s)/\omega$ from the attenuator 16 and the filtered signal from the filter 18 $(\dot{x}s/(s+\omega))$ are applied to the summing circuit 14. The current signal derived from the servo motor is relatively free of high frequency noise, therefore, the output signal from the current channel contains minimal high frequency noise components.

The output signal from the summer 14, which has position and current signal components, is passed through a second low pass filter 20 to a second summing circuit 22, which also receives the attenuated current magnitude signal from the attenuator stage 16. The output signal from the summer 22 is directed to a third low pass filter 24, and then to gain set amplifier 26. The resultant output velocity signal which has an effective noise reduction of $-18$db per octave by virtue of the three low pass filters, is used in the servo system of the disk drive to accelerate or decelerate the head actuator during accessing. The movement and velocity of the head actuator is made to follow an idealized velocity curve which is generated by a curve generator, as is known in the art. In this manner, the radial movement of the magnetic head actuator relative to the rotating storage disk is precisely controlled.

The electronic velocity measurement device depicted in FIG. 1 is capable of utilizing the optimum frequency range of the available signals by means of single pole high and low pass filters. Bandstop rolloff of $-18$db/octave is realized and significantly reduces resonant feedback effects and enhances servo system stability without limiting velocity signal bandwidth.

Figure 2:
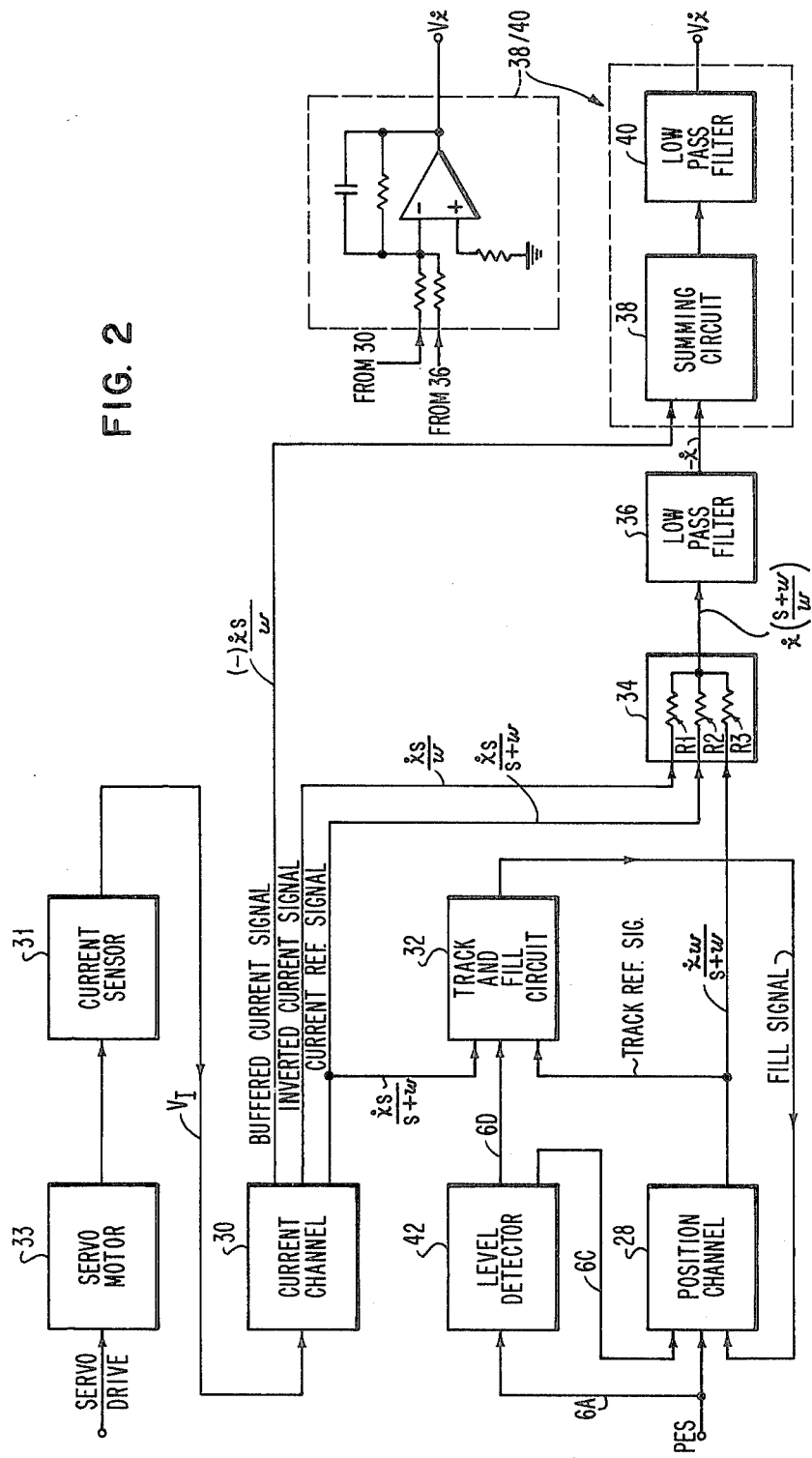
FIG. 2 is a circuit diagram, in block and schematic form, of an implementation of the electronic velocity measurement device using cyclic PES, in accordance with this invention.

In FIG. 2, an implementation of the electronic velocity measurement device, according to this invention, includes a position channel 28 and current channel 30 which provide velocity signals $(\dot{x}\omega)/(s+\omega)$ and $(\dot{x}s)/(s+\omega)$ respectively. The displacement input signal (PES) to the position channel is derived from sensing the movement of the actuator device. The input signal $V_I$ to the current channel 30 is obtained from current sensor 31 that senses the current of the voice coil in the servo motor 33. The position and current channel output velocity signals, which represent the differentiated PES and motor current signal respectively, are applied to a track and fill circuit 32, which will be described with reference to FIG. 4. In addition, a level detector or comparator 42 detects the PES input signal at the maximum and minimum linear values, and senses when the PES(6A) is entering the nonlinear region. The level detector 42 detects the linear amplitude and slope polarity of the PES, and provides a square wave fill select signal (6D) to track and fill circuit 32 and polarity select signal (6C) to position channel 28. The track and fill circuit 32 processes the velocity signal derived from the cyclically discontinuous nonlinear PES and the current reference signal derived from current magnitude to generate a continuous velocity fill-in signal. Velocity signal information is effectively filled in by track and fill circuit 32 to span the nonlinear areas of the PES signal. The current reference signal is integrated in track and fill circuit 32 during nonlinear portions of the PES signal and is used to update the PES derived velocity signal in the nonlinear regions. The updated velocity signal from track and fill circuit 32 is in turn applied to position channel 28 to provide a continuous velocity signal from position channel 28 and to eliminate the effects of high pass filter circuit recovery from the velocity output signal.

The velocity signals derived from current channel 30 and the updated continuous velocity signal from the position channel 28 are applied to the summing circuit 34 which includes connected resistors R1, R2 and R3.

The signals at the summing circuit 34 are combined and passed through low pass filter 36 to summing circuit 38. The signal output from low pass filter 36 is directly proportional to velocity, i.e. $=\dot{x}$. This signal is combined with the buffered current signal in summing circuit 38 and the combined signal is directed through a low pass filter 40 to produce an output signal representing the actual velocity of the voice coil actuator as it moves relative to the rotating disk surface. In effect, the velocity signal is developed from the position channel during low acceleration rates and from the current channel during higher acceleration rates. The velocity signal developed from the position channel additionally uses the current channel derived fill-in signal to provide continuous velocity signals from the position channel.

The low pass filters 36, 40 and 46 (see FIG. 4) each provide 6 db/octave or a total 18 db/octave rolloff, without adding any delays in the operation of the circuit components. The multiple slope rolloff suppresses the high noise levels which tend to be present in a broad bandwidth system. Additional summing and low pass filter elements similar to 38 and 40 may be added following filter 40 to increase the rolloff beyond $-18$db/octave for high resonance systems without adding delay or affecting accuracy. In this case, the buffered current signal $(\dot{x}s/\omega)$ must be input to each additional summer similar to summing circuit 38 interconnection. In addition, the single section high pass filter serves as a low bandwidth differentiator which operates over a limited range, thereby minimizing high frequency noise in the processed signal. By way of example, the high pass filter 12 operates as a differentiator over a range of 400 Hertz in a system which employs a 20 kiloHertz bandwidth.

Figure 3:
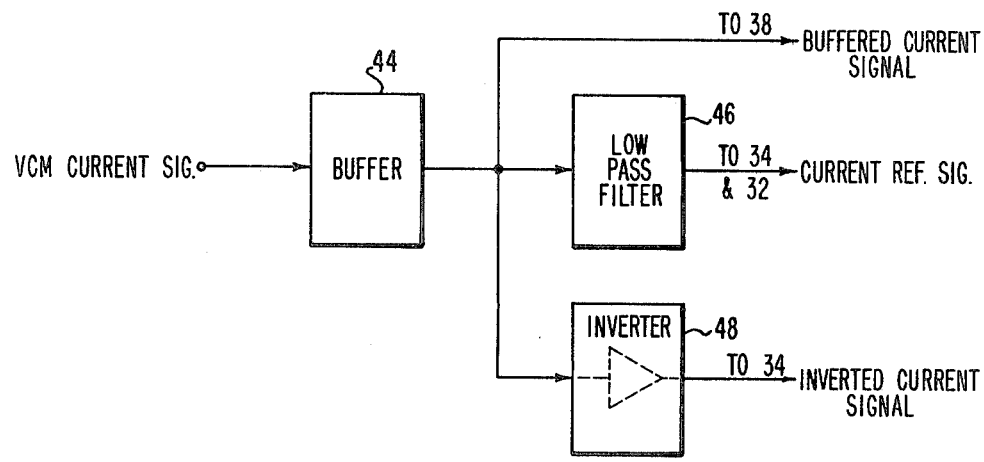
FIG. 3 is a block diagram of the current channel of FIG. 2.

With reference to FIG. 3, the current channel of the electronic tachometer includes buffer stage 44 which receives the current signal from the voice coil motor, and provides a buffered current signal to summing circuit 38. The buffer output is also passed through low pass filter 46 to provide a current reference signal to the resistor R2 of the summing circuit 34 and to track and fill circuit 32. The buffer output is also directed to inverter 48 to provide an inverted current signal to resistor R1 of summer 34.

Figure 4:
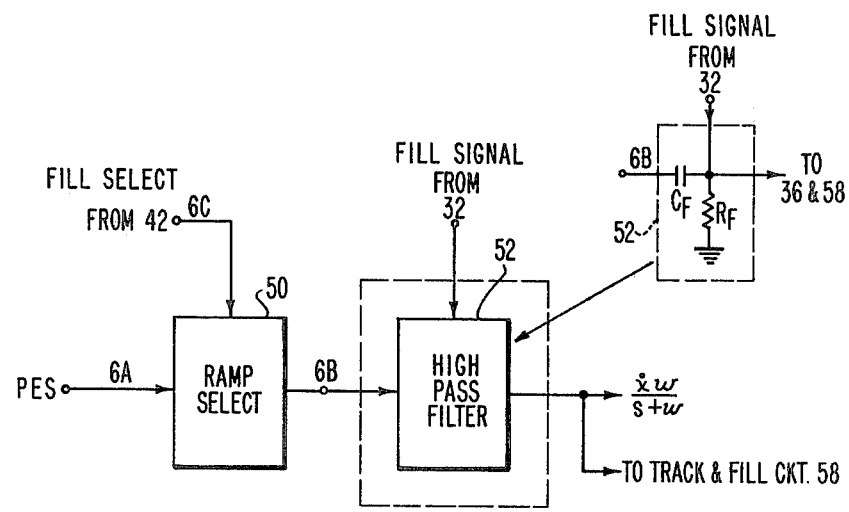
FIG. 4 is a block and schematic circuit diagram of the position channel depicted in FIG. 2.

With reference to FIG. 4, the position channel 28 of the electronic velocity measurement device includes ramp select circuit 50 which operates on the PES (6A) under control of the Polarity Select signal (6C) from level detector 42. The level detect circuit senses the slope polarity of the PES and generaates the square wave Polarity Select signal (6C) which is input to Ramp Select circuit 50. The ramp select circuit selects the slope of the PES (6A), which may be positive going or negative going, to produce a succession of positive slopes at its output. Each PES ramp represents the traversal of a servo track with zero crossings of the PES indicating that the track center has been traversed.

The output signal from high pass filter 52 is made to track the value it would assume if the PES input signal were continuous and non-cyclical by the following means:

The Position Ramp signal (6B) is directed through high pass filter 52 which receives the fill signal output from the track and fill circuit 32. The high pass filter circuit acts as a limited bandwidth differentiator and includes a charging capacitor CF and resistor RF. The differentiated position signal from the filter 52 is then combined with the velocity signal obtained from the fill-in circuit and fed to the summing circuit 34 and low pass filter 36, as shown in FIG. 2.

As previously outlined, the PES has nonlinear regions which occur in the area of the signal discontinuity produced when the servo head is between servo tracks. In order to have a continuous accurate velocity signal over the discontinuous PES region, the track and fill circuit 32 operates to fill in or clamp the output signal to the correct velocity during the nonlinear regions so that the PES velocity signal and fill signal form a continuous velocity signal. This is accomplished by clamping the output of the high pass filter 52 to the velocity signal level produced by track and fill circuit 32 during the nonlinear regions of the PES signal. The track and fill circuit output signal tracks the velocity output from the high pass filter during linear portions of PES and continuously updates the velocity output during PES nonlinearities thus providing continuous velocity output from the high pass filter.

Figure 5:
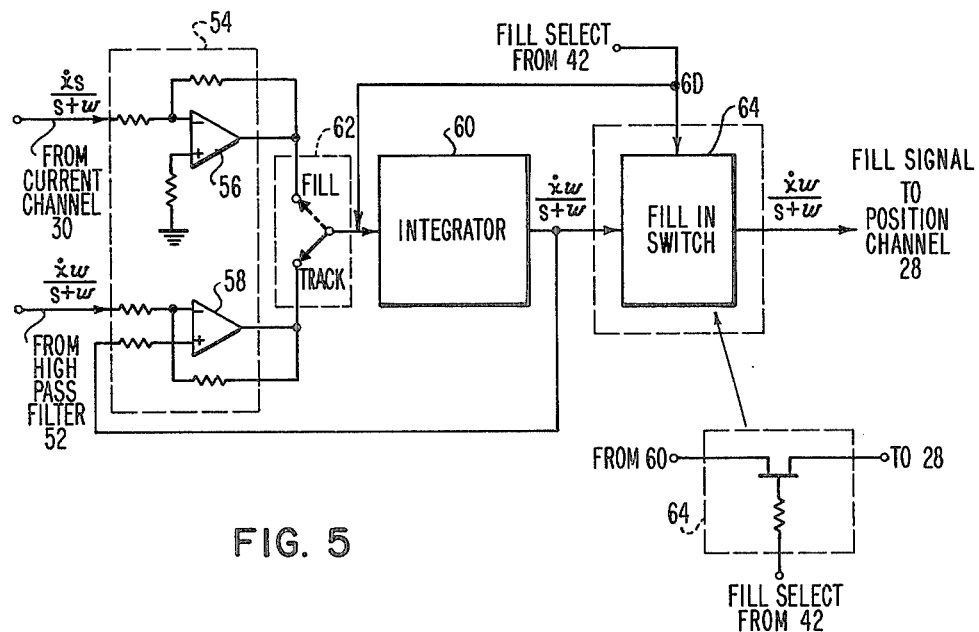
FIG. 5 is a block and schematic diagram of the track and fill circuit, as employed in FIG. 2.
Figure 6:
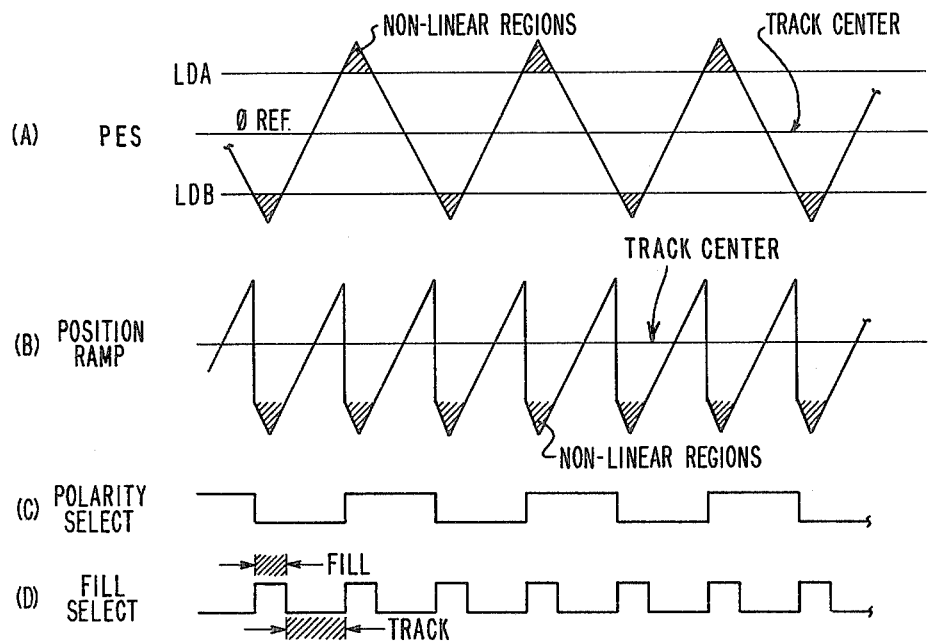
FIG. 6 A-D is a series of waveforms to aid in the explanation of the position channel timing.

In FIG. 5, the track and fill circuit includes a buffer network 54 consisting of buffer amplifier 56 and analog comparator 58. The comparator 58 compares the velocity output signal from the high pass filter 52 (FIG. 4) with the signal obtained from an integrator 60. When track fill switch 62 is closed in the track mode, the comparator 58 and integrator 60 are coupled in a closed feedback loop.

If the velocity and integrator output signals are not equal then an error signal is generated and the integrator 60 integrates the error signal until the velocity and integrator output signals to the comparator 58 are equal and the error signal is minimized. The switch 62 remains in the track position during the linear region of the PES signal, therefore the integrator output signal is identical to and tracks the generated velocity signal in the PES linear signal region.

However, when the level detector 42 senses the nonlinear region of the PES, fill select signal (6D) causes track and fill switch 62 to operate in the fill mode which disconnects integrator 60 from the comparator 58 and connects it to the current channel buffer amplifier 56. At the same time, the fill select signal (6D) to fill in switch 64 connects the integrator output fill signal to the position channel. During the nonlinear PES regions, the fill signal is derived by integrating the current reference signal with initial conditions on the integrator set by the PES velocity signal during linear region operation (track mode). The fill signal serves to clamp the output of high pass filter 52 during recovery of the PES ramp signal and during the peak portions of the PES when nonlinearities occur. In this manner, the velocity signal is derived from and continuously updated by integration of the voice coil motor current during nonlinear PES regions, thus providing a continuous and accurate velocity signal during linear and nonlinear PES regions.

Figure 7:
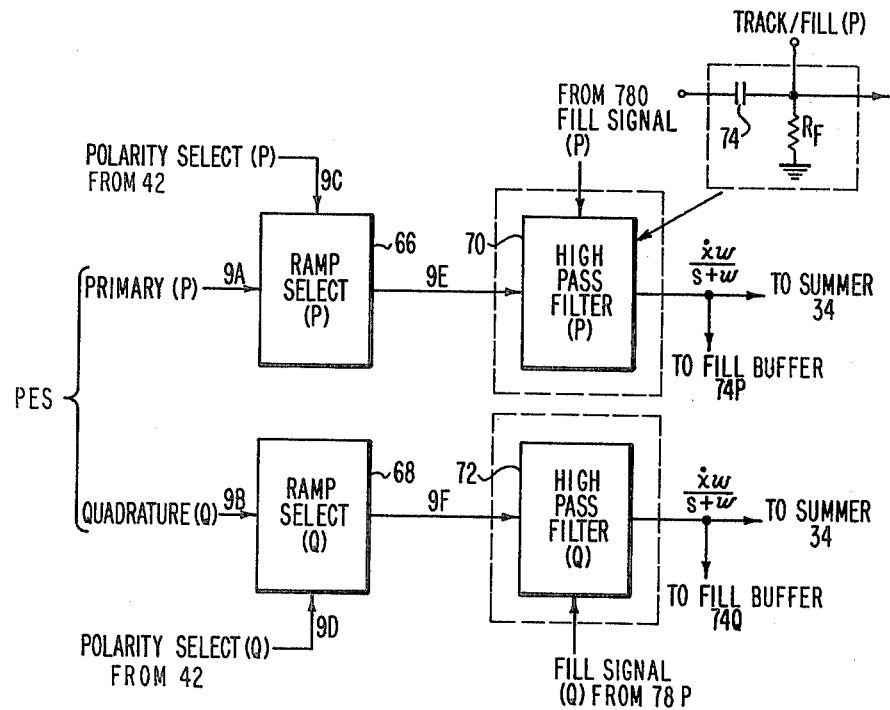
FIG. 7 is a block and schematic circuit diagram of the position channel of an electronic velocity measurement device utilizing quadrature displacement signals.
Figure 9:
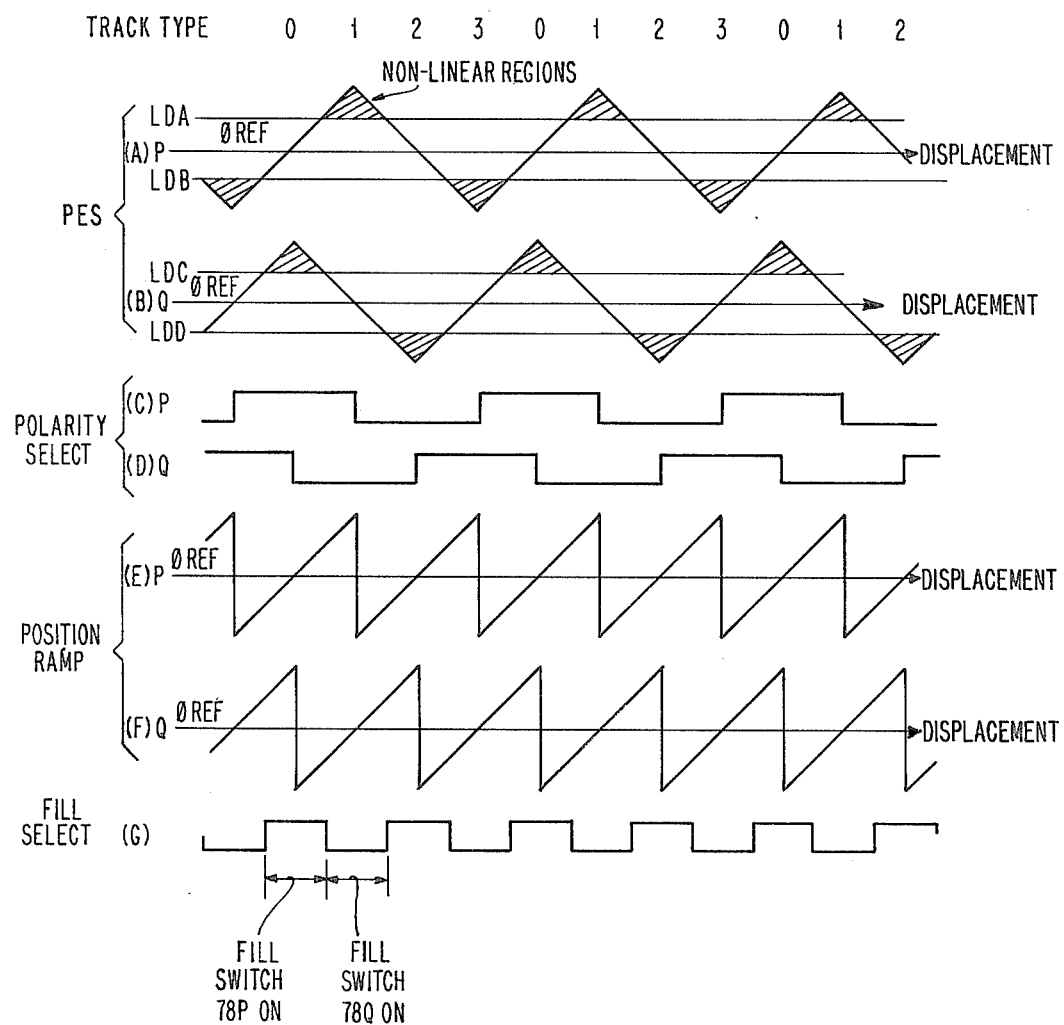
FIG. 9 depicts a series of waveforms to aid in the explanation of position channel timing in a quadrature system.

An alternative embodiment of the electronic tachometer of this invention is employed using quadrature displacement signals. This embodiment utilizes the basic elements of the velocity measurement device as outlined in FIG. 2 with modification to position channel 28 and track and fill circuit 32. The use of quadrature signals substantially reduces the deleterious effects of the PES nonlinearities on the position channel velocity signal. For this purpose, primary and quadrature channels are utilized in the position channel as illustrated in FIG. 7. The primary (P) and quadrature (Q) PES signals (9A, 9B) are applied respectively to ramp select circuits 66 and 68. Polarity Select signals (9C, 9D) are also directed from level detector 42 to the ramp select circuits. Position ramp signals (9E, 9F), which are generated by the primary and quadrature channels, are processed by the high pass filter circuits 70 and 72 that operate to generate velocity signals, as discussed previously. Each high pass filter circuit acts as a limited bandwidth differentiator and includes a charging capacitor 74 and resistor RF. The output signals from both high pass filters are connected to low pass filter 36 via summer 34 as outlined in FIG. 2. Summer 34 has an additional resistor R4 added to accommodate the second PES channel input signal. The track and fill circuit 32 is modified in this embodiment to utilize quadrature PES signals in place of motor current integration discussed previously. As noted in FIG. 9, PES(P) (9A) and PES(Q) (9B) displacement signals contain linear operating regions which overlap the nonlinear regions of the respective out-of-phase quadrature signal. There the PES(P) and PES(Q) displacement signal in combination will always provide a linear signal input to the track and fill circuit.

Figure 8:
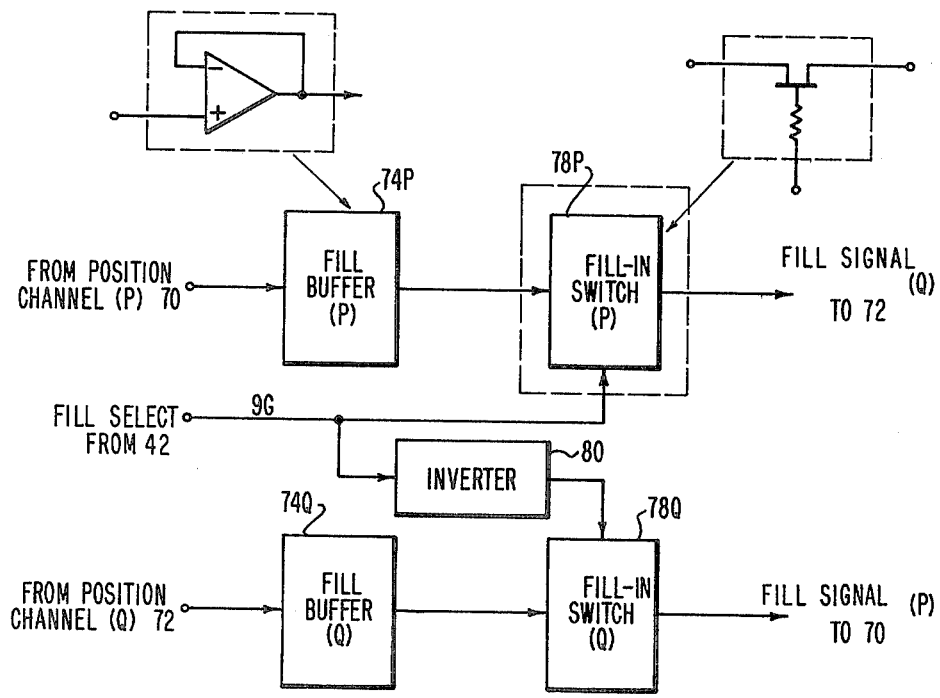
FIG. 8 is a schematic diagram of a fill-in circuit, as may be employed with a quadrature signal electronic velocity measurement device.

Quadrature track and fill circuit shown in FIG. 8 includes fill buffer 74 and fill-in switch circuitry 78. Referring to waveform (9G) and comparing waveform (6D) indicates that fill select for quadrature implementation is symmetrical, i.e., fill-in occupies one half of the PES cycle. Reference to FIG. 8 will also show that the fill signals are now provided by the PES channel in quadrature rather than by current integration as in FIG. 5.

A detailed operation of the quadrature track and fill is described as follows: When operating with quadrature PES, the velocity signal from the PES(P) channel high pass filter 70 is buffered by buffer 74P and appears at fill switch 78P. During the nonlinear portion of PES(P) signal (9A), the PES(Q) signal (9B) is linear. Fill-in is provided by fill buffer 74Q via fill-in switch 78Q to clamp the output of high pass filter 72P to the correct signal output level. This fill-in continues until PES(P) signal (9A) returns to the velocity signal linear region and the output from high pass filter 72P is unclamped.

Following the fill interval for PES(P), the PES(Q) signal (9B) reaches the extreme of its linear region and fill-select (9G) reverse polarity. The PES(P) vellocity output signal from filter 72 is buffered by fill buffer 74P and appears at fill switch 78P which is now energized. This signal effectively clamps the PES(Q) velocity signal output from filter 70 to the correct signal level during the nonlinear region of the PES(Q) signal.

By alternating between PES(P) and PES(Q) signals and effectively clamping the appropriate nonlinear channel, a continuous accurate position channel velocity signal is obtained without use of current integration.

There has been described an electronic velocity measurement device that employs the displacement signal and voice coil motor current to generate a velocity signal, which is made to be continuously accurate over a broad range of velocities by means of novel low bandwidth differentiator/track and fill circuitry that provides velocity signal fill-in during discontinuous nonlinear regions of the displacement input signal. A rolloff of −18db/octave is realized to reduce resonant feedback effects and to enhance servo system stability without limiting velocity signal bandwidth. In the quadrature system, two low bandwidth entiators and associated track and fill circuitry are used to provide a continuous signal proportional to velocity from the primary and quadrature position channels respectively, thereby eliminating the need to estimate the velocity signal during the nonlinear intervals in the displacement input signals.

The unique feature of this invention is the use of a low bandwidth differentiator in combination with track and fill to generate a continuous accurate velocity signal equivalent to that generated by a wide bandwidth differentiator of a continuous noise-free displacement signal with no discontinuities or nonlinearities.

What is claimed is:

1. An electronic velocity measurement device for sensing velocity of a current driven actuator means comprising:
   a displacement signal channel having means for deriving displacement signals having discontinuous portions and a limited bandwidth;
   low bandwidth differentiating means coupled to said displacement signal deriving means for generating velocity signal components;
   a current signal channel having means for deriving current signals from said actuator means and for generating velocity signal components at high acceleration rates;
   means coupled to said channels for providing a fill-in signal during the discontinuous portions of said displacement signals; and
   means to combine the velocity signal components from said displacement signal channel and said current signal channel with said fill-in signal, so that a continuous accurate velocity signal over the entire velocity range of said actuator is produced.

2. An electronic velocity measurement device as in claim 1, wherein said means for providing a fill-in signal comprises a track and fill circuit coupled to the output of said current channel and said position channel and coupled to input of said position channel.

3. An electronic velocity measurement device as in claim 2, wherein said track and fill circuit comprises an integrator coupled to the outputs of said position error signal channel and said current signal channel; and a switching means connected between said channels and said integrator for switching the operation of said circuit from a track mode when coupled to said position channel and to a fill-in mode when coupled to said current channel.

4. An electronic velocity measurement device as in claim 1, wherein said current channel includes a first low pass filter, further including second and third low pass filters coupled to the output of said position error signal and said current signal channels for providing effective noise reduction in the velocity output signal derived from said electronic velocity measurement device.

5. An electronic velocity measurement device as in claim 1, wherein said narrow bandwidth differentiating means comprises a high pass filter operating over a limited bandwidth.

6. An electronic velocity measurement device as in claim 1, wherein said displacement error signal channel includes a primary network and a quadrature network for processing primary and quadrature displacement signals.

7. An electronic velocity measurement device as in claim 6, wherein said displacement signal channel comprises first and second high pass filters for processing said primary and quadrature displacement signals respectively.

8. An electronic velocity measurement device as in claim 6, wherein said means for providing said fill-in signal comprises a fill circuit which utilizes primary and quadrature derived velocity signals to effectively eliminate the effects of displacement signal non-linearity on the velocity output signal.

* * * * *

UNITED STATES PATENT AND TRADEMARK OFFICE
CERTIFICATE OF CORRECTION

PATENT NO. : 4,246,536
DATED : January 20, 1981
INVENTOR(S) : Edward F. Bradley et al.

It is certified that error appears in the above—identified patent and that said Letters Patent is hereby corrected as shown below:

Column 5, line 35, after "the", first occurrence, insert

-- PES --.

Signed and Sealed this

Seventh Day of July 1981

[SEAL]

Attest:

RENE D. TEGTMEYER

*Attesting Officer*   *Acting Commissioner of Patents and Trademarks*

UNITED STATES PATENT AND TRADEMARK OFFICE
CERTIFICATE OF CORRECTION

PATENT NO. : 4,246,536

DATED : January 20, 1981

INVENTOR(S) : Edward F. Bradley et al.

It is certified that error appears in the above—identified patent and that said Letters Patent is hereby corrected as shown below:

Column 6, line 41, delete "velocity signal"

line 42, after "the" insert -- velocity signal --.

line 66, "entiators" to read -- differentiators --.

Column 8, line 23, delete "error".

Signed and Sealed this

Tenth Day of November 1981

[SEAL]

Attest:

Attesting Officer

GERALD J. MOSSINGHOFF

Commissioner of Patents and Trademarks